United States Patent [19]
Leiper

[11] Patent Number: 6,112,234
[45] Date of Patent: Aug. 29, 2000

[54] METHOD FOR TRANSFER OF RADIOGRAPHIC IMAGES

[76] Inventor: Thomas W. Leiper, 216 Cascade Rd., Stamford, Conn. 06903

[21] Appl. No.: 09/108,394

[22] Filed: Jul. 1, 1998

Related U.S. Application Data

[60] Provisional application No. 60/051,384, Jul. 1, 1997.

[51] Int. Cl.[7] .................................................. G06F 15/16
[52] U.S. Cl. .......................... 709/219; 709/217; 345/326; 345/327; 345/329; 345/340
[58] Field of Search ..................................... 709/217, 219, 709/227, 228; 345/326, 327, 329, 331, 340; 395/200.47

[56] References Cited

U.S. PATENT DOCUMENTS

| | | | |
|---|---|---|---|
| 5,235,510 | 8/1993 | Yamada et al. | 364/413.02 |
| 5,272,760 | 12/1993 | Echerer et al. | 382/132 |
| 5,274,759 | 12/1993 | Yoshioka | 600/440 |
| 5,293,313 | 3/1994 | Cecil et al. | 382/131 |
| 5,452,416 | 9/1995 | Hilton et al. | 345/346 |
| 5,715,823 | 2/1998 | Wood et al. | 600/437 |
| 5,790,977 | 8/1998 | Ezekiel | 702/122 |
| 5,838,906 | 11/1998 | Doyle et al. | 709/202 |

*Primary Examiner*—Andrew I. Faile
*Assistant Examiner*—Habte Bahgi
*Attorney, Agent, or Firm*—St. Onge Steward Johnston & Reens, LLC

[57] ABSTRACT

A protocol for transfer of medical radiographic image series that provides for transmission of image files in a non-serial order, to provide for transmission of image files where the images most likely to be useful for diagnosis are transmitted first. Under a default protocol the midpoint image of each series of images in a patient study is transmitted prior to endpoint or other images in the series. The default protocol can either build out the image series from the midpoint image to the endpoint image, or it can transmit the midpoint image of a series, followed by the endpoint images of a series, followed by successive sub-midpoint images between the endpoints and the midpoint image. The default protocol also transfers each image with a partial pixel depth prior to transmission of the entire series with full pixel depth. The receiving diagnostic physician can override the default protocol and select desired images for immediate transfer.

15 Claims, 2 Drawing Sheets

METHOD FOR TRANSFER OF RADIOGRAPHIC IMAGES

I hereby claim priority under 35 U.S.C. § 119(e) to U.S. Provisional Patent application Ser. No. 60/051,384, filed Jul. 1, 1997.

FIELD OF THE INVENTION

The present invention relates to the field of electronic transfer of image files as used in medical contexts, and specifically, to the field of transferring radiographic image files from a transmitting site where a patient is located, to a to receiving site where a skilled radiologist is located, to allow for immediate medical expertise where required to treat an ailing or injured patient.

BACKGROUND OF THE INVENTION

The present invention is a method for use in the transmission of radiographic images from a remote site where the patient has been CAT scanned or otherwise imaged, to the location where a diagnosing physician, such as a radiologist, is located. In such systems, the images are usually in the form of electronic files in graphic formats such as bitmap files, and are transmitted via telephone dial-up lines to the location of the diagnosing physician.

Such image transmissions are fairly slow, requiring on the order of 45 minutes to transfer an entire patient study. This is because the patient study will usually consist of a series of images made by taking a series of image "slices" through the patient; the image slices may be processed to provide different series with different degrees of contrast. There can also be image series taken across more than one axis of the body; for example, the skull may be imaged top to bottom, or side to side. Thus, a patient study will comprise a number of image series which each contain a significant number of images. As such, there is a large amount of pixel data, which can require a significant time to be transferred.

In conventional radiographic image transmission systems, the images are transmitted sequentially from beginning to end of the series. Typically the images series are arranged in the order of image capture, i.e. slices starting from top or bottom, or one side or the other, and progressing in order to the end of the series.

SUMMARY OF THE INVENTION

The present invention comprises a file transfer protocol in which the most useful images in a patient study are transmitted first, in order to permit a faster diagnosis by the radiologist when time is critical.

This is achieved in three aspects. The first aspect is a default download management method that determines the order of the images in the series to be transmitted, so that images likely to contain the most relevant medical information are transmitted first. The second aspect is a pixel depth protocol that sends progressive "bit planes" of the 8 bit or 12 bit image, so that image resolution is built up over time. The third aspect is a protocol that allows the receiving station to control the order of image transfer.

There are two preferred default download management protocols: (1) a "midpoint" protocol in which the image series are sent by selecting the midpoint of the remaining images to be sent; and (2) a "building out" protocol where images are sent in an order that builds out from the midpoint of an image series.

An example of the "midpoint" protocol would work as follows in a seven image series consisting of images 1, 2, 3, 4, 5, 6 and 7: the first image to be transmitted will be the midpoint image, image 4, followed by endpoint images 1 and 7, then followed by image 3 (the selected midpoint of 1 and 4—since there is no image 3.5), image 5 (the selected midpoint of 4 and 7—since there is no image 5.5), image 2 (the midpoint of 1 and 3), and image 6 (the midpoint of 5 and 7). In an alternative embodiment, endpoint images 1 and 7 are transmitted first, followed by midpoint image 4, and images 3, 5, 2 and 6, as described in the last sentence. Where there are more than one series, the "midpoint" protocol selects the midpoint image for each one of the different series and transmits those images first, then follows with the first and last images in each of the series, then follows with additional "midpoint" images for each series as described above.

In the "building out" embodiment, the middle image of each series is selected as the first image to be transmitted, and the download management protocol builds the image series from the middle image to the first and last images. In other words, instead of sending a 7 image series in order of 1, 2, 3, 4, 5, 6, 7; the series are sent in order as 4, 3, 5, 2, 6, 1, 7. Where there are multiple series in a patient study, the middle image of each series is transmitted, followed by the "building out" sequence for all the remaining images in each series. Thus for example, in a patient study consisting of images 100010001, 100010002, and 100010003 in series 1; and 100020001, 100020002, and 100020003 in series 2; the images will be sent in the following order: 100010002, 100020002, 100010001, 100020001, 100010003, 100020003.

The invention is accomplished through a file transfer protocol where the transmitting station first transmits a header or file list containing information on the number and types of images in the series, followed by the images themselves. The receiving station has download manager software that interacts with the transmitting station software to select the images to be transmitted in what order, which selections are then transmitted by the transmitting station. This permits the most important information to be sent most quickly.

In the default mode the system will operate in a mode as described above. However, there is an additional aspect to the invention, namely, that the receiving physician can control the order of the images transmitted. Thus the physician can select a particular image set most likely to be useful, and override the default mode of transmission to receive those images which are of immediate diagnostic interest. In the preferred embodiment, the physician may override the default transmission order by either of two methods: (1) viewing a display of the file list, and then selecting (by, for example, highlighting and clicking with a mouse) the image(s) of initial interest from the list of files initially transmitted by the transmitting station; and (2) more preferably, by simply selecting the image in the image series where the physician desires to obtain the first information, or by lingering beyond a preset time period on a certain image or view.

DETAILED DESCRIPTION OF THE INVENTION

It should be appreciated that bandwidth is a perpetually limiting factor in the transfer of data, particularly image data that contains significant amounts of information. As such, despite faster modem speeds, more and better transmission lines, and so forth, there is a need to control data transfer so that the most urgent data arrives first. The present invention addresses that need and presents a method of transfer of medical radiographic images that is applicable in all environments where such image transfers occur, whether in a network, wide area network, dial-up communication, or in the internet.

The present invention may be implemented in both a free standing desktop computer or a networked system. The present invention may be embodied in a standard personal computer operating a Windows, Windows 95 or Windows NT based operating system or in other standard and proprietary hardware/software environments, having an appropriate high resolution monitor, mouse/traceable and standard personal computer components, including communications hardware such as a network card and/or a modem and/or other communications ports. Preferably, the present invention is implemented in a system of the type described in my U.S. patent application Ser. No. 08/887,906 filed Jul. 3, 1997 entitled "System for Manipulation and Display of Medical Images," the disclosure of which is hereby incorporated by reference in its entirety.

Figure 1:
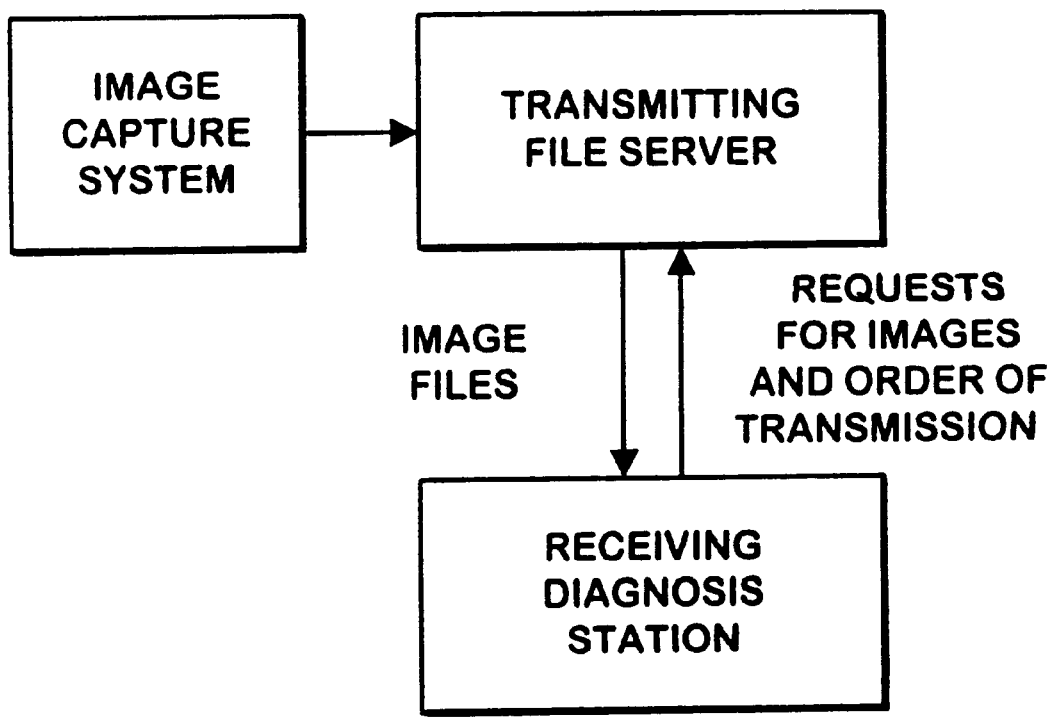
FIG. 1 is a schematic flowchart illustrating the method of the invention.

The method of the invention includes some or all of the following steps: diagrammatically shown in FIG. 1.

1. The transmitting station 10 establishes a communications link to the receiving station 16 via a communications line 18 (as noted above, this may be a network server/workstation link in a local or wide area network, or a remote terminal dial-up link, an internet link).

2. The transmitting station 10 transmits to the receiving station 16 one or more electronic files which are stored in a transmitting file server 14 and contain defined data relating to the patient study to be transmitted. The defined data includes one or more of, and preferably all of: an electronic folder name, the patient's name, a description of the patient study, the names of all the electronic image files to be transmitted, the date and time of the images contained in the patient study to be transmitted. Preferably, but not necessarily, the defined data also includes the number of electronic image series and the number of electronic image files captured by an image captures system 12 in each series to be transmitted.

3. The receiving station 16 acknowledges receipt of file list.

4. The receiving station has a preprogrammed image order sequence preference. The preference may be a default mode selected by the manufacturer or a specific standard order preference selected by the diagnosing physician or other responsible personnel. The receiving station calculates which images should be sent in what order, by applying its preprogrammed image order sequence preference to the information contained in the file list.

5. The receiving station sends a command file, or an IPC (inter process communication) request, to the transmitting station specifying the preference as to the order of transmission of images via the communication line 18.

6. The transmitting station transmits the images in the order specified by the receiving station.

7. If the receiving station does not provide a preference for the order of transmission of images, the transmitting station will send the image series in a default order selected by the transmitting station. The data transmission is accomplished by data transmission that allows a build up of the pixel depth of the image so that an early outline of the image is received and then develops pixel depth as the image data is transmitted.

8. Upon completion of the image transmission, the receiving station transmits verification of receipt of all image data to the transmitting station. The communications link between the receiving station and transmitting station may be disconnected if in a dial-up environment. If additional patient image data is to be sent, the remote and receiving stations will remain connected via the communications link and a new patient image set can be sent.

The invention is preferably implemented using the Z modem protocol, which is a robust transmission protocol that has many established features that are desirable for use in the present invention, such as built-in error checking features, and the ability to request and monitor retransmission of bad blocks of data. The Z modem protocol also has the ability to begin transmission of a new file before completion of a prior file transmission, and to continue an interrupted file transfer where the transfer left off. Although the Z-modem protocol has historically been associated only with dial-up data transfer (as in bulletin board systems), it can be applied in network or wide area network system by assigning each computer in the network an IP address and providing for image transfer from a server to a workstation by a TCP to TCP port communication.

There are two preferred default image order sequence protocols: (1) a "midpoint" protocol in which the image series are sent by selecting the midpoint of the remaining images to be sent; and (2) a "building out" protocol where images are sent in an order that builds out from the midpoint of an image series.

An example of the "midpoint" protocol would work as follows in a seven image series consisting of images 1, 2, 3, 4, 5, 6 and 7: the first image to be transmitted will be the midpoint image, image 4, followed by endpoint images 1 and 7, then followed by image 3 (the selected midpoint of 1 and 4—since there is no image 3.5), image 5 (the selected midpoint of 4 and 7—since there is no image 5.5), image 2 (the midpoint of 1 and 3), and image 6 (the midpoint of 5 and 7). In an alternative embodiment, endpoint images 1 and 7 are transmitted first, followed by midpoint image 4, and images 3, 5, 2 and 6, as described in the last sentence. Where there are more than one series, the "midpoint" protocol selects the midpoint image for each one of the different series and transmits those images first, then follows with the first and last images in each of the series, then follows with additional "midpoint" images for each series as described above.

In the "building out" embodiment, the middle image of each series is selected as the first image to be transmitted, and the download management protocol builds the image series from the middle image to the first and last images. In other words, instead of sending a 7 image series in order of 1, 2, 3, 4, 5, 6, 7; the series are sent in order as 4, 3, 5, 2, 6, 1, 7. Where there are multiple series in a patient study, the middle image of each series is transmitted, followed by the "building out" sequence for all the remaining images in each series. Thus for example, in a patient study consisting of images 100010001, 100010002, 100010003; and 100020001, 100020002, and 100020003; the images will be sent in the following order: 100010002, 100020002, 100010001, 100020001, 100010003, 100020003.

The receiving station would, as described above, choose such an image order sequence and request transmission of the images in a selected order. However, the selected order of transmission can be modified at any time by the diagnosing physician. The diagnosing physician can interrupt the file transfer process and request a specific file be transferred by a number of different ways. One specific method is to simply highlight and click on the file name in the transmitted file list. Another is to click on an image or image frame in a template; another is simply to allow the receiving station to request a particular image in a template if the user leaves a mouse cursor over a particular image or image frame in a template. Thus, if the diagnosing physician selects an image for display and such image remains displayed for a period of time exceeding a set time period, the physician's workstation causes the transmitting station to begin transmission of images beginning with the image corresponding to the image in the template where the cursor is positioned. The physician's selection determined by lingering on an image is determined by the receiving station by frequent periodic polling of the displayed image selection. "Clicking" generates a keyboard or mouse interrupt that is interpreted by the CPU. Under any of the above selection methods, the previously selected transmission preference is modified to cause the newly selected image (or series of images) to be transmitted prior to transmission of other images.

It is to be appreciated that the physician may modify the default preference at any time in the image transmission, without requiring the transmission to be restarted. In the preferred embodiment, using a Z modem protocol, the modified preference order takes effect immediately, interrupting transfer of the image then being transmitted. In such case, it may be necessary to resend the interrupted image, although the Z modem protocol should coordinate the transmission to complete the image transfer without resending the interrupted image. In another embodiment, the modified preference order takes effect upon completion of transmission of the image then being transmitted.

The modified preference order is communicated to the transmitting station by the receiving station. The receiving station creates a new file specifying the modified preference order, which will specify the order of all images in the complete sets of series. The file will specify the physician selected images as the first images to be transmitted, with the remaining images specified in an order in accordance with a second default file transfer protocol. The receiving station transmits the new command file or sends an IPC request to the transmitting station. The transmitting station checks the modified preference order to determine if any of the images in the modified preference order file have been already transmitted, and will then proceed with transmission of additional images in the modified preference order.

The above described "template" is a image display on a computer monitor or monitors based on the transmitted file list, i.e., if a file list indicated a set of five series, each having 8 images, a series of five templates, one for each series would be shown.

The ability to select from a series of images is different from selection from a list. While very detailed information about a series of slices can be presented in a list format (such as the field of view, the number of slices and the thickness of the slices), from the visual data provided by the mid point and end points of a series of slices, a physician can much more quickly determine the portion of a series of images which is relevant and to "steer" the image transfer process to get the most important images first.

In the default download protocol the pixel depth of particular images is increased in steps in addition to the image series being built out as described. In this way, there is additional image information quickly available with respect to the slices in between the mid point slices and the end point slices. Even though it may take longer to transmit information for all of the slices, the net result is a shorter time period to transfer the most critical images. In other words, a physician who is trying to decide which image slice between a mid point and an end point is most likely to be relevant will be able to make that decision much more easily if he already has the most significant two bits of data displayed for that slice. As he pauses his navigation on that slice and the resolution of the pixel depth of that slice begins to build, a determination to navigate to an adjacent slice can be made prior to the image achieving full resolution. This is not a problem because in this pixel building scheme there is no wasted data transmission, because the additional pixel depth can always be added to the image later when the download protocol is resumed.

In summary, the object is to first provide the most relevant information as quickly as possible which allows the physician to make the decision as to the download preference for the most medically relevant information. The physician receives enough information to make a decision about what information is available, and after selecting the area of interest or the information that is most likely to be important medically, controls the flow of date to develop the desired images. Thus the method of the invention provides information for decision making about what data to review, followed by information for medical decisions about diagnosis and treatment.

Figure 3:
FIG. 3 is an illustration of a transmitted image as initially received.
Figure 4:
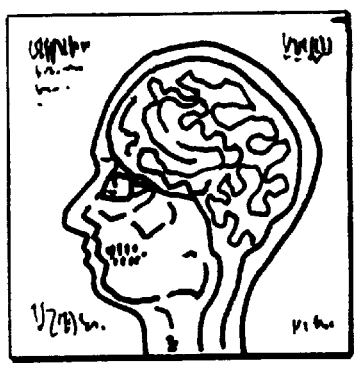
FIG. 4 is a an illustration of a transmitted image with additional pixel depth.
Figure 2:
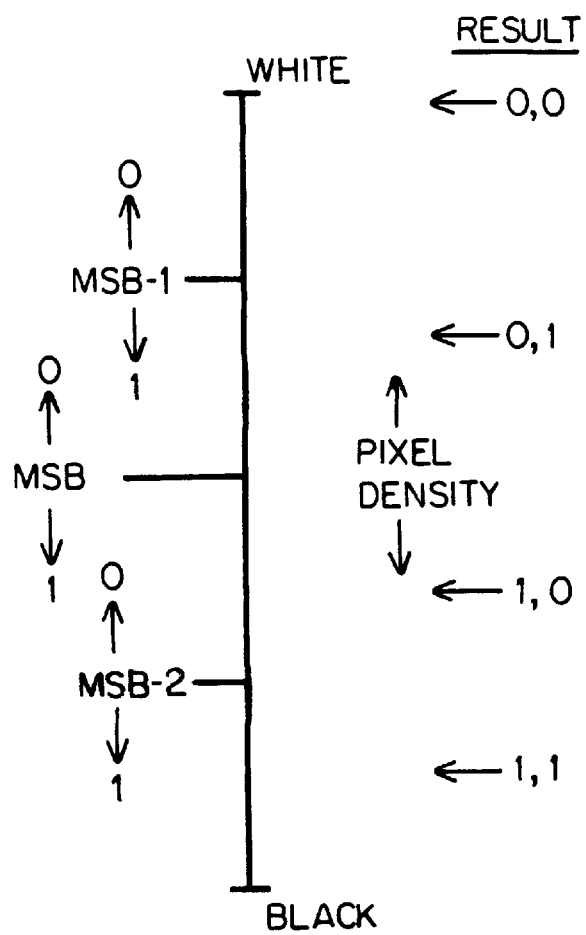
FIG. 2 is a schematic illustration of the pixel depth protocol.

In order to provide the earliest initial data soonest, a pixel depth protocol is implemented in the invention. In this system, the image pixel density data is transmitted so that a two color (black/white) image is built up at the receiving station with pixel dept increasing over time. This allows a diagnosing physician at the receiving station to review image data at the earliest possible time, and to take control of the transfer process by selecting the desired next image for transfer. The pixel depth protocol is implemented as shown in FIG. 2, with the result that the transmitted image may first appear as an outline as in FIG. 3, and later additional detail is developed as in FIG. 4 as the pixel depth builds.

In a preferred embodiment, the images are presented in the monitor as a "serial display", i.e. each image in the series is presented in the system monitor as a single image, in serial order. Each template would then consist of a group of distinct screen displays, with each screen bearing appropriate identifying information from the file list, e.g. "patient name, sagittal section, image 3" displayed in a screen. A "mock image" might also be displayed in the template screen until the actual image is downloaded. Thus, for example, if a file list indicated a "sagittal section", a small sagittal section of a normal patient image would be displayed. Such image would serve to orient the physician by providing a visual representation of the area of the image being transmitted assisting the diagnosing physician in navigating through the images as they are being downloaded. Each template would consist of the appropriate number of image frames, with the identifying information (e.g. "patient name, sagittal section, image 3") displayed in the frame.

As noted above, the physician can then select a particular "aimpoint"—a particular image in the template containing the specific image most likely to be useful. The physician may also alternatively select a particular series of images (such as the Image 5 in each of the different sets of series, or all of a particular series). As prior noted, this could be accomplished by "clicking" on the desired image or group of images to be transmitted. Thus, in the serial display mode, the physician would "click" on the desired image in the template. In another embodiment, this could be accomplished by the physician selecting a specific image for display for a predetermined period, e.g. 5, 10, 15, 20, 25, or 30 seconds. If a physician "lingers" on an image for such a period of time, the system will proceed with the downloading of that image.

As noted above, this action of selecting a specific image then causes the download manager at the receiving station to instruct the transmitting station to send the image(s) of interest first. After the selected images have been transmitted, the protocol specified in the new command file will call for transmission of images adjacent to the selected image(s). Thus, for example, if image 5 of 7 is selected after image 5 is transmitted, images 4, 6, 3, 7, 2 and 1 will be subsequently transmitted. This is referred to as "building out" the image set from the selected image(s). In another second default transmission management, as in the initial default embodiment, the first and last images of the various series will be transmitted, followed by the midpoint image between the prior transmitted selected images and the first and last images of the various series.

The present invention provides a unique file transfer protocol for increasing the speed at which a diagnosing physician can render advice to another medical professional at a remote site, by allowing the diagnosing physician to select images of diagnostic interest for immediate transmission, and further by modifying the standard image transmission protocol to a more flexible protocol likely to provide an earlier receipt of relevant diagnostic data.

What is claimed is:

1. A method of transferring one or more series of electronic image files, representing radiographic images in a patient study, which image series have a midpoint image and endpoint images, from a transmitting station to a receiving station, comprising the steps of:
   said transmitting station transmitting to the receiving station one or more electronic files containing defined data relating to the patient study, said defined data comprising one or more of: an electronic folder name, the patient's name, the names of all the electronic image files to be transmitted, the number of electronic image series and the number of electronic image files in each series to be transmitted, a description of the patient study, the date and time of the images contained in the patient study;
   said receiving station calculating a desired image order sequence from said defined data;
   said receiving station transmitting a request for said desired image order sequence preference to said transmitting station, said desired image order sequence being a sequence in which said electronic image files are transmitted in an order wherein the first image transmitted is a midpoint image of a series;
   said transmitting station transmitting said electronic image files to said receiving station in the order specified in said request for said desired image order.

2. A method in accordance with claim 1, wherein said first image transmitted is a midpoint image of a first series in said patient study, and subsequent images transmitted are midpoint images of all other series contained in the patient study.

3. A method in accordance with claims 1, wherein subsequent images are transmitted from said transmitting station to said receiving station in an order to build out an image series from the midpoint image to the endpoint images of said image series.

4. A method in accordance with claim 2, wherein subsequent images are transmitted from said transmitting station to said receiving station in an order to build out each image series from the midpoint image to the endpoint images of said image series.

5. A method in accordance with claim 4, wherein subsequent images are transmitted from said transmitting station to said receiving station in an order to build out each image series from the midpoint image to the endpoint images by transmitting images from each different series in an order so that each series is built at the same rate.

6. A method in accordance with claim 1, wherein the endpoint images of the image series are transmitted from said transmitting station to said receiving station subsequent to transmission of said midpoint image, and where subsequent images transmitted are midpoint images between the prior transmitted midpoint and the endpoint images.

7. A method in accordance with claim 2, wherein the endpoint images of the first image series are transmitted from said transmitting station to said receiving station subsequent to transmission of said first midpoint images, and where subsequent images transmitted are endpoint images for said other series, followed by midpoint images between the prior transmitted midpoint and the endpoint images for the first and other series.

8. A method of transferring one or more series of electronic image files, representing radiographic images in a patient study, which image series have a midpoint image and endpoint images, from a transmitting station to a receiving station, comprising the steps of:
   said transmitting station transmitting to the receiving station one or more electronic files containing defined data relating to the patient study, said defined data comprising one or more of: an electronic folder name, the patient's name, the names of all the electronic image files to be transmitted, the number of electronic image series and the number of electronic image files in each series to be transmitted, a description of the patient study, the date and time of the images contained in the patient study;
   said receiving station calculating a desired image order sequence from said defined data;
   said receiving station transmitting a request for said desired image order sequence preference to said transmitting station;
   said transmitting station transmitting said electronic image files to said receiving station in the order specified in said request for said desired image order, except that if said receiving station fails to transmit a request for a desired image order subsequent to transmission of said one or more electronic files containing defined data within a defined time period, said transmitting station calculates a desired image order sequence from said defined data; and transmits said electronic image files to said receiving station in said desired image order sequence.

9. A method in accordance with claim 8 wherein said desired image order sequence is selected from the group of sequences consisting of an building out image order sequence or a midpoint image order sequence.

10. A method in accordance with claims 1, 2, 3, 4, or 8 wherein said electronic image files are transmitted in accordance with a pixel depth protocol where each image in a series or in a group of images to be transmitted is transmitted with a incomplete pixel depth data prior to transmission of a complete series of images.

11. A method in accordance with claims 1, 2, 3, 4, or 8 wherein a user may select an electronic image file for priority transmission in advance of other electronic image files in said desired image order sequence.

12. A method in accordance with claim 11, wherein the receiving station may alter a requested image order sequence by transmitting a request for a new image order sequence.

13. A method in accordance with claim 12 wherein the receiving station displays a template in a monitor associated with said receiving station, said template comprising a series of frames for containing each image to be transmitted.

14. A method in accordance with claim 13 wherein the receiving station will alter a requested image order sequence when a user selects a frame in said displayed template, and wherein selection of the frame causes the receiving station to request the image corresponding to the frame as the image for transmission.

15. A method in accordance with claim 14 wherein the receiving station determines that a user has selected an image for transmission by polling a mouse pointer location, and if a mouse pointer has remained in a fixed position over a particular image frame in an image template for a time exceeding a predetermined period of time, then requesting the transmitting station to transmit the image selected in advance of other electronic image files in said desired image order sequence.

* * * * *